United States Patent
Stessen

(10) Patent No.: US 10,750,173 B2
(45) Date of Patent: Aug. 18, 2020

(54) ENCODING AND DECODING HDR VIDEOS

(71) Applicant: KONINKLIJKE PHILIPS N.V., Eindhoven (NL)

(72) Inventor: Jeroen Hubert Christoffel Jacobus Stessen, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 16/081,056

(22) PCT Filed: Mar. 7, 2017

(86) PCT No.: PCT/EP2017/055265
§ 371 (c)(1),
(2) Date: Aug. 30, 2018

(87) PCT Pub. No.: WO2017/153376
PCT Pub. Date: Sep. 14, 2017

(65) Prior Publication Data
US 2019/0089956 A1    Mar. 21, 2019

(30) Foreign Application Priority Data
Mar. 7, 2016 (EP) .................................... 16158941

(51) Int. Cl.
*H04N 19/30* (2014.01)
*H04N 19/186* (2014.01)
(Continued)

(52) U.S. Cl.
CPC .......... *H04N 19/12* (2014.11); *H04N 1/6005* (2013.01); *H04N 1/6027* (2013.01); *H04N 9/77* (2013.01); *H04N 19/186* (2014.11); *H04N 19/30* (2014.11)

(58) Field of Classification Search
CPC ..................................................... H04N 19/12
See application file for complete search history.

(56) References Cited

U.S. PATENT DOCUMENTS 5,450,216 A * 9/1995 Kasson ................. H04N 1/6058
358/518
6,677,959 B1 * 1/2004 James ..................... G06T 5/008
345/589

(Continued)

FOREIGN PATENT DOCUMENTS

| WO | 2014056679 A1 | 4/2014 |
| WO | 2015124754 A1 | 8/2015 |

OTHER PUBLICATIONS

François, Edouard et al., "High Dynamic Range and Wide Color Gamut Video Coding in HEVC: Status and Potential Future Enhancements", IEEE Transactions on Circuits and Systems for Video Technology, vol. 26, No. 1. Jan. 2016.

(Continued)

*Primary Examiner* — Irfan Habib

(57) ABSTRACT

To have a much better usable pragmatic manner of HDR video encoding and decoding, the inventor invented a high dynamic range video decoder (500) arranged to receive an encoding (Im_COD) of a high dynamic range video and to decode and output a set of temporally successive images (Im_RHDR) comprising: An input (502) to receive three weight values (kRY, kGY, kBY); A video decoder (501) arranged to decode the encoding (Im_COD) into an intermediate image (Im_RLDR) being in a Y'CbCr color representation; A brightness index calculation unit (503) arranged to calculate for each pixel of the intermediate image (Im_RLDR) a brightness index (J') being defined as $J'=Y'+\text{MAX}\{kRY*(R'-Y'), kGY*(G'-Y'), kBY*(B'-Y')\}$; A brightness mapper (505) arranged to receive a specification of at least one one-dimensional function F_ct, and to apply it with the brightness index (J') as input, to obtain an output brightness index (J*); A multiplication factor calculation unit (506) arranged to calculate a multiplicative factor (g) being equal to the output brightness index (J*) divided by (Continued)

the brightness index (J'); Three multipliers (509, 510, 511) to multiply the respective color components (Y, Cr, Cb) of each pixel of the intermediate image (Im_RLDR) with the multiplicative factor (g), to obtain an output color (Y'H, Cb'H, Cr'H) for that pixel in the output dynamic range image (Im_RHDR) of the set of temporally successive images being currently decoded.

6 Claims, 8 Drawing Sheets

(51) Int. Cl.
*H04N 19/12* (2014.01)
*H04N 1/60* (2006.01)
*H04N 9/77* (2006.01)

(56) References Cited

U.S. PATENT DOCUMENTS

| | | | | |
|---|---|---|---|---|
| 6,862,012 | B1* | 3/2005 | Funakoshi | G09G 3/2092 345/101 |
| 6,864,916 | B1* | 3/2005 | Nayar | H04N 5/2355 348/224.1 |
| 8,248,486 | B1* | 8/2012 | Ward | H04N 1/4072 348/223.1 |
| 8,831,343 | B2* | 9/2014 | Kunkel | H04N 1/6088 382/167 |
| 9,020,257 | B2* | 4/2015 | El-Mahdy | G06T 5/009 348/207.1 |
| 9,129,445 | B2* | 9/2015 | Mai | G06T 11/60 |
| 9,230,509 | B2* | 1/2016 | Van Der Vleuten | G06T 3/0056 |
| 9,699,482 | B2* | 7/2017 | Mertens | H04N 1/6058 |
| 10,171,812 | B2* | 1/2019 | Toma | H04N 19/46 |
| 10,244,244 | B2* | 3/2019 | Piramanayagam | G06T 5/007 |
| 10,257,526 | B2* | 4/2019 | Luginbuhl | H04N 19/124 |
| 10,397,536 | B2* | 8/2019 | Strom | G06T 3/00 |
| 10,567,826 | B2* | 2/2020 | De Haan | H04N 21/42653 |
| 2005/0231457 | A1* | 10/2005 | Yamamoto | G09G 3/3413 345/102 |
| 2006/0104508 | A1* | 5/2006 | Daly | G06T 5/009 382/167 |
| 2007/0222728 | A1* | 9/2007 | Koyama | G09G 5/02 345/87 |
| 2010/0128786 | A1* | 5/2010 | Gao | H04N 19/147 375/240.13 |
| 2012/0113130 | A1* | 5/2012 | Zhai | G06T 5/008 345/589 |
| 2013/0107956 | A1* | 5/2013 | Muijs | G06T 9/004 375/240.12 |
| 2015/0067089 | A1* | 3/2015 | Rajan | H04L 67/14 709/213 |
| 2015/0201222 | A1* | 7/2015 | Mertens | H04N 19/46 382/233 |
| 2015/0221280 | A1* | 8/2015 | Van Der Vleuten | G06T 5/002 382/167 |
| 2015/0237322 | A1* | 8/2015 | Stec | H04N 9/77 348/453 |
| 2015/0358646 | A1* | 12/2015 | Mertens | H04N 1/6058 382/166 |
| 2016/0360214 | A1* | 12/2016 | Sole Rojals | H04N 19/182 |
| 2016/0366449 | A1* | 12/2016 | Stessen | H04N 9/77 |
| 2017/0289555 | A1* | 10/2017 | Su | H04N 19/14 |
| 2018/0103257 | A1* | 4/2018 | Zheng | H04N 19/46 |
| 2018/0152721 | A1* | 5/2018 | Rusanovskyy | H04N 19/46 |
| 2018/0176579 | A1* | 6/2018 | Andrivon | H04N 19/463 |
| 2018/0278808 | A1* | 9/2018 | Hsu | H04N 5/235 |
| 2018/0288381 | A1* | 10/2018 | He | H04N 9/646 |
| 2019/0089956 | A1* | 3/2019 | Stessen | H04N 1/6027 |
| 2019/0089988 | A1* | 3/2019 | Strom | H04N 19/186 |
| 2019/0098317 | A1* | 3/2019 | Lu | H04N 19/149 |

OTHER PUBLICATIONS

Lasserre, S. et al, "Technicolor's response to CfE for HDR and WCG (category 1)—Single layer HDR video coding with SDR backward compatibility", International Organisation for Standardisation Organisation Internationale De Normalisation ISO/IEC JTC1/SC29/WG11 Coding of Moving Pictures and Audio, Jun. 2015, Warsaw, Poland.

* cited by examiner

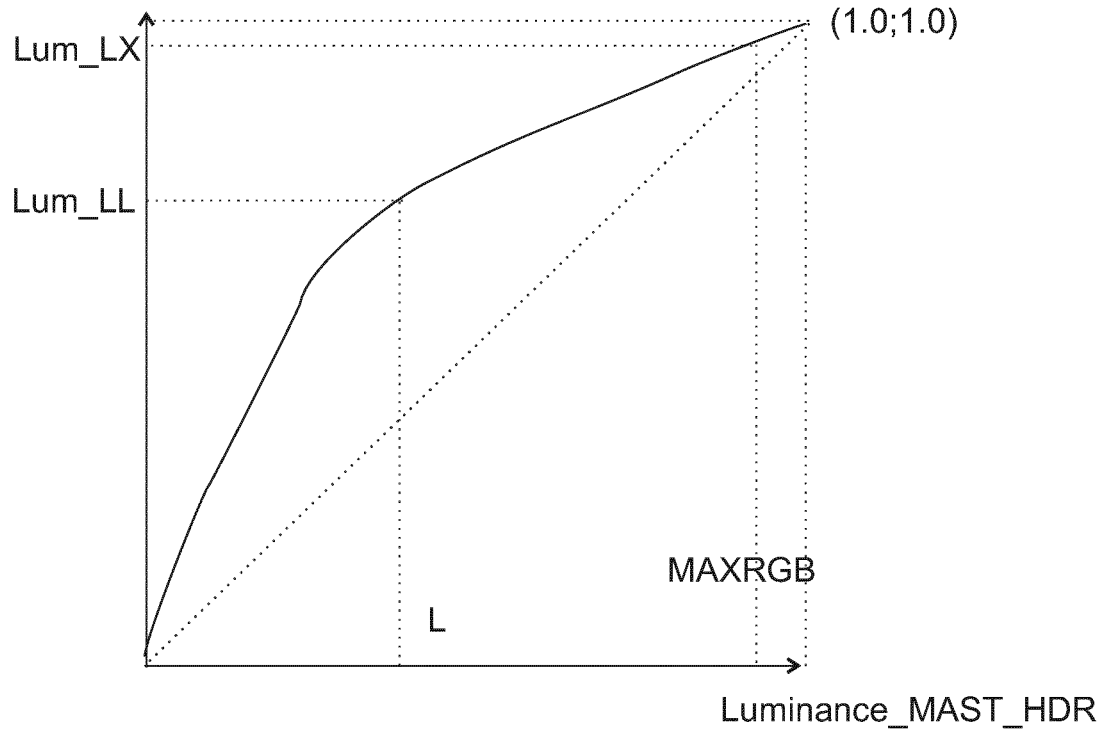
Fig 4A
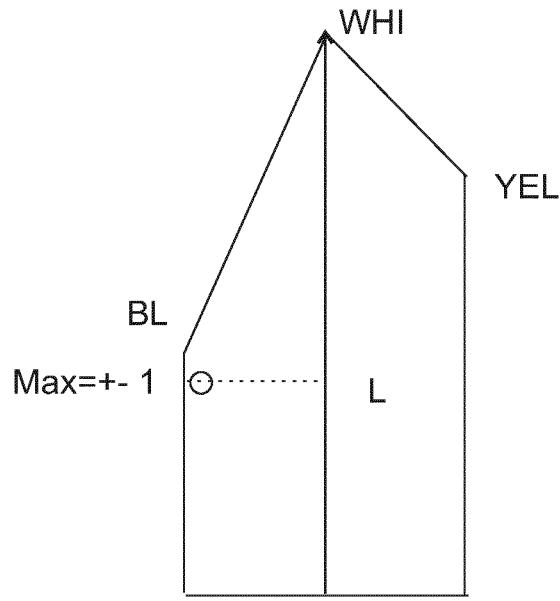
Fig. 4B
Fig. 4

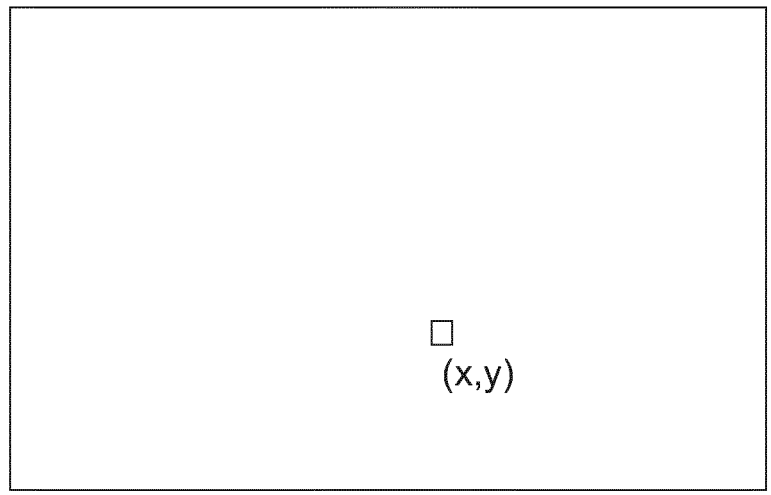
Fig. 7A
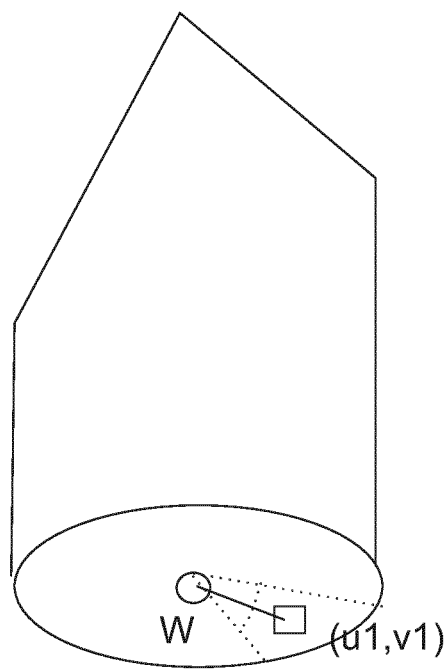
Fig. 7B
Fig. 7

ENCODING AND DECODING HDR VIDEOS

CROSS-REFERENCE TO PRIOR APPLICATIONS

This application is the U.S. National Phase application under 35 U.S.C. § 371 of International Application No. PCT/EP2017/055265, filed on 7 Mar. 2017, which claims the benefit of European Patent Application No. 16158941.1, filed on 7 Mar. 2016. These applications are hereby incorporated by reference herein.

FIELD OF THE INVENTION

The invention relates to methods and apparatuses for encoding respectively decoding a temporally successive set of high dynamic range images, called herein a HDR video.

BACKGROUND OF THE INVENTION

Until a couple of years ago, all video was encoded according to the so-called low dynamic range (LDR) philosophy, also called standard dynamic range (SDR). That meant, whatever the captured scene was, that the maximum of the code (typically 8 bit luma Y'=255; or 100% voltage for analog display driving) should by standardized definition correspond to, i.e. be rendered on, a display with a peak brightness PB (i.e. the brightest white color it can render) being by standard agreement 100 nit. If people bought an actual display which was a little darker or brighter, it was assumed that the viewer's visual system would adapt so that the image would still look appropriate and even the same as on the reference 100 nit display, rather than e.g. annoyingly too bright (in case one has e.g. a night scene in a horror movie which should have a dark look).

Of course, for practical program making this typically meant maintaining a tight control of the scene lighting setup, since even in perfectly uniform lighting the diffuse reflection percentage of various objects can already give a contrast ratio of 100:1. The black of such a SDR display may typically be 0.1 nit in good circumstances, yet 1 nit or even several nits in worst circumstances, so the SDR display dynamic range (the brightest white divided by the darkest viewable black) would be 1000:1 at best, or worse, which corresponds nicely to such uniform illuminated scenes, and an 8 bit coding for all the required to be rendered pixel grey values or brightnesses, having a gamma of approximately 2.0, or encoding inverse gamma 0.5. Rec. 709 was the typically used SDR video coding. Typically also cameras had problems capturing simultaneously both very bright and rather dark regions, i.e. a scene as seen outside a window or car window would typically be clipped to white (giving red, green and blue additive color components R=G=B=max., corresponding to their square root coded values R'=G'=B'=255). Note that if in this application a dynamic range is specified firstmost with a peak brightness (i.e. the brightest rendered or renderable luminance) only, we assume that the lowest luminance value is pragmatically zero (whereas in practice it may depend on viewing conditions such as display front plate or cinema screen light reflection, e.g. 0.1 nit), and that those further details are irrelevant for the particular explanation. Note also that there are several ways to define a dynamic range, and that the most natural one typically used in the below explanations is a display rendered luminance dynamic range, i.e. the luminance of the brightest color versus the darkest one.

Note also, something which has become clearer during the HDR research, and is mentioned here to make sure everybody understands it, that a code system itself does not natively have a dynamic range, unless one associates a reference display with it, which states that e.g. R'=G'=B'=Y'=255 should correspond with a PB of 100 nit, or alternatively 1000 nit, etc. In particular, contrary to what is usually pre-assumed, the number of bits used for the color components of pixels, like their lumas, is not a good indicator of dynamic range, since e.g. a 10 bit coding system may encode either a HDR video, or an SDR video, determined by the type of encoding, and in particular the electro-optical transfer function EOTF of the reference display associated with the coding, i.e. defining the relationship between the luma codes [0, 1023] and the corresponding luminances of the pixels, as they need to be rendered on a display.

In this text it is assumed that when a HDR image or video is mentioned, it has a corresponding peak brightness or maximum luminance for the highest luma code (or equivalently highest R', G', B' values in case of an RGB coding e.g. rather than an Y'CbCr encoding) which is higher than the SDR value of 100 nit, typically at least 4× higher, i.e. the to be rendered maximum display luminance for having the HDR image look optimal may be e.g. 1000 nit, 5000 nit, or 10000 nit (note that this should not be confused with the prima facie complex concept which will be detailed below that one can encode such a HDR image or video as a SDR image or video, in which case the image is both renderable on a 100 nit display, but importantly, also contains all information—when having corresponding associated metadata encoding a color transformation for recovering the HDR image—for creating a HDR image with a PB of e.g. 1000 nit!).

So a high dynamic range coding of a high dynamic range image is capable of encoding images with to be rendered luminances of e.g. up to 1000 nit, to be able to display-render good quality HDR, with e.g. bright explosions compared to the surrounding rendered scene, or sparkling shiny metal surfaces, etc. And simultaneously relatively dark pixel colors or their luminances can be encoded (even if not rendered on display). So for avoidance of doubt, when the present text talks about high dynamic range (created original) images, or codings of those images, we mean that the coding can at least handle a luminance range greater than what the standard rec. 709-based SDR coding could handle, i.e. whatever the brightest code is actually mapped to on a display as rendered luminance, the coding would be capable of encoding a luminance range of at least larger than 1000:1, and preferably much larger to enable coding of scenes with even higher illumination contrasts.

In practice, there are scenes in the world which can have very high dynamic range (e.g. an indoors capturing with objects as dark as 1 nit, whilst simultaneously seeing through the window outside sunlit objects with luminances above 10,000 nit, giving a 10000:1 dynamic range, which is 10× larger than a 1000:1 DR, and even 100 times larger than a 100:1 dynamic range, and e.g. legacy TV viewing may have a DR of less than 30:1 in some typical situations, e.g. daylight viewing). When one would like to be able to render at least in theory the most realistic images to humans, one can debate about what a human would like to see simultaneously as contrasting pixel luminances on a display, or the simpler question of what he is able to see well. On both aspects there has been debate, perhaps somewhat wanting to prove a particular point, and sometimes it is said that 10,000:1 luminance contrast ratio should be sufficient, but if a person walks in a dark street he sees both dark pixels well below one nit, and bright lights which can be several 1000s or 10,000s of nits, and this is not necessarily unwatchable. So although there may be pragmatic choices as to what luminances should or can easily be rendered, in the present text for the elucidation of the concepts, we don't want to limit ourselves too much on what an upper limit of dynamic range for any HDR scene would necessarily always need to be.

Since displays are becoming better (a couple of times brighter PB than 100 nit, with 1000 nit currently appearing, and several thousands of nits PB being envisaged), a goal is to be able to render these images beautifully, and although not exactly identical to the original because of such factor like different viewing conditions, at least very natural, or at least pleasing. And this needs what was missing in the SDR video coding era: a good pragmatic HDR video coding technology, and, the good use of such video, e.g. when rendering it optimally.

The reader should also understand that because a viewer is typically watching the content in a different situation (e.g. sitting in a weakly lit living room at night, or in a dark home or cinema theatre, instead of actually standing in the captured bright African landscape), there is no identity between the luminances in the scene and those finally rendered on the TV (or other display). This can be handled inter alia by having a human color grader manually decide about the optimal colors on the available coding DR, i.e. of the associated reference display, e.g. by prescribing that the sun in the scene should be rendered in the image at 5000 nit (rather than its actual value of 1 billion nit). Alternatively, automatic algorithms may do such a conversion from e.g. a raw camera capturing to what in the text will be (generically) called a (master) HDR grading. This means one can then render this master grading on a 5000 nit PB HDR display, at those locations where it is available. Even if we say that a pragmatic good version for the peak brightness of a coding (PB_C) may be typically e.g. 5000 nit, it doesn't mean than one cannot encode any higher dynamic range scenes, in any chosen coding specification, and then render them optimally on whatever display one has available with whatever display peak brightness (PB_D), the latter being a question of optimal display tuning of the HDR image(s). I.e. there is no particular need to encode any image in a fully display-referred manner, let alone to ultimately fix the creation of any content to any particular display (e.g. a 5000 nit, or even worse a 1000 nit PB_D display).

This being indicative of how one could encode any master HDR image (per se), at the same time however, there will for the coming years be a large installed base of people having a legacy SDR display of 100 nit PB, or some display which cannot make 5000 nit white, e.g. because it is portable, and those people need to be able to see the HDR movie too. So there needs to be some mechanism to convert from a 5000 nit HDR to a 100 nit SDR look image of the same scene. There exists however a problem, which is the mirror problem of the fact that we needed HDR video coding because one cannot just keep rendering SDR video which is intended for SDR displays of PB_D of around 100 nit on ever higher peak brightness displays. Because that image when rendered will look far too bright, the mood of e.g. a night scene in a thriller may be totally lost, as if one switches on a battery of lights like on the ceiling of a supermarket. If one was then to conclude one could just make a single kind of HDR graded images, those may look in many circumstances way too dark for direct SDR rendering. That is because, if we look at the pixel luminances in a relative [0.0-1.0] representation, the darkest pixel luminances will be a very small fraction of the brightest ones. E.g. consider a night scene with a criminal moving through the shadows (may be barely visible), when there is also some bright light somewhere in the image. E.g., in a 1000 nit graded coding for rendering on a 1000 nit display, we may consider that the criminal is well rendered with pixel luminances up to 10 nit, whilst the light should be nicely bright if rendered at 1000 nit. That means there is a contrast ratio of 100:1 between those two pixel regions in the image. If we now use the classical paradigm of the relative rendering of the SDR-era, namely map the brightest white (or PB_C) of the coding to the display brightest white (PB_D), then for a 100 nit SDR display this means that the relevant action of the criminal will fall below 1 nit. This could be below the front glass reflections on the display, so instead of nicely watching the movie, the SDR viewer may be straining his eyes to try to see what's happening. One can imagine that "some brightening" of that darkest pixels would be advantageous to get at least some better SDR image, but one can also imagine that preferably this is not done arbitrary, but rather content dependent. So one needs a second image grading always, and a way to communicate it somehow to any receiver.

FIG. 1 shows a couple of illustrative examples of the many possible HDR scenes a HDR system of the future (e.g. connected to a 1000 nit PB display) may need to be able to correctly handle, i.e. by rendering the appropriate luminances for all objects/pixels in the image. E.g. ImSCN1 is a sunny outdoors image from a western movie, whereas ImSCN2 is a nighttime image. What makes HDR image rendering different from how it always was in the LDR era which ended only a couple of years ago, is that the LDR had such a limited dynamic range (about PB=100 nit, and black level+−0.1 to 1 nit), that mostly only the reflectivities of the objects could be shown (which would fall between 90% for good white and 1% for good black). So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. So one had to conventionally color the night scenes blue, so that the viewer would understand he was not looking at a daytime scene. Now of course in real life human vision would also adapt to the available amount of light, but not that much (most people in real life recognize that it's getting dark). So one would like to render the images with all the spectacular local lighting effects that one can artistically design in it, to get much more realistic rendered images at least if one has a HDR display available.

So on the left axis of FIG. 1 are object luminances as one would like to see them in a 5000 nit PB master HDR grading for a 5000 nit PB display. If one wants to convey not just an illusion, but a real sense of the cowboy being in a bright sunlit environment, one must specify and render those pixel luminances sufficiently bright (though also not too bright), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. We see a dark cave, with a small opening through which we see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects, so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

It can be understood that it may not always be a trivial task to map all the object luminances for all these very different types of HDR scene to optimal luminances available in the much smaller SDR or LDR dynamic range (DR_1) shown on the right of FIG. 1, which is why preferably a human color grader may be involved for determining the color transformation (which comprises at least a luminance transformation, or luma transformation when equivalently performed on the luma codes). However, one can always choose to use automatically determined transformations, e.g. based on analyzing the color properties of the image content such as its luminance histogram, and this may e.g. be a preferred option for simpler kinds of HDR video, or applications where human grading is less preferred e.g. as in real-time content production (in this patent it is assumed that without limitation grading could also involve the quick setting of a few color transformation function parameters, e.g. for the whole production quickly prior to the start of capturing).

Applicant has designed a coding system, which not only can handle the communication (encoding) of merely a single standardized HDR video, for a typical single kind of display in the field (with every end viewer having e.g. a 1000 nit PB display), but which can at the same time communicate and handle the videos which have an optimal look for various possible other display types with various other peak brightnesses in the field, in particular the SDR image for a 100 nit PB SDR display.

Encoding only a set of HDR images, i.e. with the correct look i.e. image object luminances for a rendering on say a 1000 nit HDR monitor, in e.g. a 10 bit legacy MPEG or similar video coding technology is not that difficult. One only needs to establish an optimal OETF (opto-electronic transfer function) for the new type of image with considerably larger dynamic range, namely one which doesn't show banding in the many compared to white relatively dark regions, and then calculate the luma codes for all pixel/object luminances.

Applicant however designed a system which can encode images of a first dynamic range actually as images of a second dynamic range, e.g. communicating HDR images actually as LDR images, i.e. then actually LDR (or SDR, i.e. referred to a 100 nit PB reference display, and often optimally color graded on such a reference display) images are communicated to a receiver, which then can already immediately be used for rendering the correctly looking SDR look on legacy 100 nit PB SDR displays (without wanting to lose generality, in the description below we assume to have such an embodiment, in which HDR images with a content peak brightness of say PB_C=1000 nit are actually communicated as 100 nit PB_C i.e. SDR images, with in addition the necessary color transformation functions to reconstruct the PB_C=1000 nit look images from the received 100 nit SDR images being received as metadata). So one should understand that these SDR images are also an important component of actually HDR correct artistic look images being communicated.

Thereto, a set of appropriate reversible color transformation functions F_ct is defined, as is illustrated with FIG. 2. These functions may be defined by a human color grader, to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR), or, automatic analysis algorithms may be used at the content creation side for determining suitable such color transformation functions F_ct. Note that instead of relying on a receiving side to invert the functions F_ct into IF_ct, one can also send already the needed functions for calculating Im_RHDR from the received and decoded intermediate SDR image Im_RLDR. So what the color transformation functions actually do is change the luminances of the pixel in a HDR image (MAST_HDR) into LDR luminances, i.e. the optimal luminance compression as shown in FIG. 1 to fit all luminances in the 100 nit PB LDR dynamic range DR_1. Applicant has invented a method which can keep the chromaticities of the colors constant, effectively changing only their luminances, as will be elucidated below.

A typical coding chain as shown in FIG. 2 works as follows. Some image source 201, which may e.g. be a grading computer giving an optimally graded image, or a camera giving a HDR output image, delivers a master HDR image MAST_HDR, to be color transformed and encoded. A color transformer 202 applies a determined color transformation, e.g. a concave bending function, which for simplicity of elucidation we will assume to be a gamma function with coefficient gam=1/k and k a number larger than 2.0. Of course more complex luminance mapping functions may be employed, provided that they are sufficiently reversible, i.e. the Im_RHDR image has negligible or acceptable banding. By applying these color transformation functions F_ct comprising at least luminance transformation functions, an output image Im_LDR results. This image or set of images is encoded with a legacy LDR image encoder, which may potentially be modified somewhat, e.g. the quantization tables for the DCT-ed transformations of the prediction differences may have been optimized to be better suited for images with HDR characteristics (although the color transformations may typically already make the statistics of the Im_LDR look much more like a typical LDR image than a typical HDR image, which HDR image typically has relatively many pixels with relatively dark luminances, as the upper part of the range may often contain small lamps etc.). E.g., a MPEG-type encoder may be used like HEVC (H265), yielding an encoded SDR image Im_COD. This video encoder 203 then pretends it gets a normal SDR image, although it also gets the functions F_ct which allow the reconstruction of the master HDR image, i.e. effectively making this a dual co-encoding of both an SDR and a HDR look, and their corresponding set of images (Im_RLDR, respectively Im_RHDR). There may be several manners to communicate this metadata comprising all the information of the functions F_ct, e.g. they may be communicated as SEI messages. Then a transmission formatter 204 applies all the necessary transformations to format the data to go over some transmission medium 205 according to some standard, e.g.

a satellite or cable or internet transmission, e.g. according to ATSC 3.0, i.e. packetization of the data is performed, channel encoding, etc. At any consumer or professional side, a receiver 206, which may be incorporated in various physical apparatuses like e.g. a settopbox, television or computer, undoes the channel encoding by applying unformatting and channel decoding. Then a video decoder 207 applies e.g. HEVC decoding, to yield a decoded LDR image Im_RLDR (this is the intermediate image which can be used for directly driving a legacy SDR display if available, but which must still be color transformed to obtain from it a HDR or MDR image as required for displays with higher display peak brightness PB_D). Then a color transformer 208 is arranged to transform the SDR image to an image of any non-LDR dynamic range. E.g. the 5000 nit original master image Im_RHDR may be reconstructed by applying the inverse color transformations IF_ct of the color transformations F_ct used at the encoding side to make the Im_LDR from the MAST_HDR. A display tuning unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc.

FIG. 3 shows how one can design such a chromaticity-preserving luminance re-calculation, taken from WO2014056679, which applicant believes would be the closest prior art for understanding the present invention. One can understand this processing when seen in the gamut normalized to 1.0 maximum relative luminance for both the SDR and the HDR image (i.e. assuming that the SDR and HDR have the same e.g. Rec. 2020 primaries, they have then exactly the same tent-shaped gamut; as shown in FIG. 1 of WO2014056679). If one were to drive any display with e.g. the cowboy having in the driving image a luma code corresponding to a luminance of 10% of peak brightness of the display, then that cowboy would render ever brighter the higher the PB of the display is. That may be undesirable, as we may want to render the cowboy with (approximately) the same luminance on all displays, e.g. 60 nit. Then of course his relative luminance (or the corresponding 10 bit luma code) should be lower the higher the PB of the display is, to get the same ultimate rendered luminance. I.e., one could represent such a desire as a downgrading mapping e.g. from luma code 800 for the SDR image, to e.g. luma code 100 for the HDR image (depending on the exact shape of the EOTF defining the codes which is used), or, in luminances one maps the 60% SDR luminance to e.g. $1140^{th}$ of that for a 4000 nit HDR display or its corresponding optimally graded image. Downgrading in this text means changing the luma codes of the pixels (or their corresponding to be rendered luminances) from a representation of higher peak brightness (i.e. for rendering on a higher PB display, e.g. of 1000 nit PB) to the lumas of an image of the same scene in a lower PB image for rendering on a lower PB display, e.g. a 100 nit SDR display, and upgrading is the opposite color transformation for converting a lower PB image into a higher PB image, and one should not confuse this with the spatial upscaling and downscaling, which is adding new pixels respectively dropping some pixels or some color components of those pixels. One can do that for any color, in which a (RGB) triplet corresponds to some chromaticity (x,y) in the display or encoding code gamut, in a manner which will automatically scale to the maximum luminance available (renderable) for that chromaticity Lmax(x,y), by the apparatus of FIG. 3.

We see that FIG. 3 consists of two parts, which should be well understood. The upper track consists of processing to determine a multiplicative factor g, which can be determined in various manners. In particular, one could do so in a linear or non-linear representation of RGB (the non-linear R' being e.g. the square root of the linear R), but we will assume for now that the RGB components are linear. In practice, one could just use some Lookup table to get L*=LUT(L). But it is important to understand that with the geometrical shape of the function which is represented as the LUT, the creation side (e.g. a human color grader, or an automatic image analysis system that proposes e.g. a function composed of three linear parts) determines how exactly particular HDR luminances (of their possible values between 0.0X nit and e.g. 5000 nit which are codeable in the HDR coding) are to correspond with equivalent SDR luminances, i.e. to be calculated if a SDR image is needed for an input HDR image. If one knows that a luma of a pixel color (i.e. the coding of the luminance) is related in a precise functional manner to the pixel color luminance, one can equivalently specify a functional relationship between two luminances (e.g. the SDR luminance of the SDR grading corresponding to the HDR luminance in the M_HDR original master HDR grading), one can also specify the desired luminance transformation as a luma transformation, with a somewhat different function shape. Sometimes there may be an advantage to specify a luma transformation, e.g. if the luma domain is more perceptually uniform the grader may get quicker to his desired look, but for the present description and its teachings we will assume a decoder receives a luminance transformation specification in case no specific codification of the transformation function is required (some apparatuses may easily transform the specification to whatever color space they use internally). So the upper track consists of establishing which kind of luminance changing behavior is needed for calculating a second image with a different dynamic range than the input image, and more precisely, this transformation is summarized as a multiplication value for each pixel, depending at least on that pixel color (and in more advanced versions the multiplication factor could also depend e.g. on the pixel position).

The lower part shows how the apparatus can actually implement the luminance transformation of each pixel color in e.g. the HDR image to its SDR equivalent (or for a decoder we assume in the elucidations that the transformation typically transforms a received SDR image into some HDR image, or some medium dynamic range (MDR) image for serving a display with a particular display peak brightness PB_D which lies between the content peak brightness of the master HDR image M_HDR, and the 100 nit PB_C of the SDR corresponding grading). The luminance (or "brightness") of a color is given by the length of the vector, so if again we have e.g. linear components RGB, one can scale the vector by multiplying with the appropriate value g, representing the luminance transformation from HDR-to-LDR, or alternatively LDR-to-HDR for that color. But one can technically find that also this lower branch can be equivalently realized on some other color representations, e.g. Y' CbCr, with Y' a typical luma as e.g. defined in Rec. 709, and Cb and Cr corresponding chrominances.

Actually, one can demonstrate that this 3-component color transformation corresponds to applying a similar luminance mapping, which on the achromatic axis (i.e. of colors having no particular hue) maps the input luminance L of the color in the SDR image, to the needed relative output luminance L* of the optimal HDR graded image. Without diving into details, what is relevant from this teaching, is that the corresponding color transformation can then be realized as a multiplicative transformation on the (in the prior art preferably linear) RGB components, on each component separately, by a multiplier 311, with three times the same constant g larger or smaller than 1.0, which corresponds to whatever shape of the luminance transformation function L_out=TM(L_in) one chooses (e.g. a human color grader on the creation side, or some artificial intelligent automatic re-grading algorithm), which can also be formulated as a functional transformation of the maximum of the input red, green and blue color values of a pixel. So for each input color (R,G,B), the appropriate g-value is calculated for applying the desired color transformation which transforms Im_RLDR into Im_RHDR (or in an appropriately scaled manner into any other graded image, like Im3000 nit), when luminance mapper 307 gets some SDR-luminance to HDR_luminance mapping function, e.g. a parametrically specified loggamma function or sigmoid, or a multilinear curve received as a LUT. The components of the exemplary embodiment circuit are: 305: maximum calculator, outputting the maximum one (maxRGB) of the R, G, and B values of a pixel color being processed; 301: luminance convertor, calculating the luminance of a color according to some color definition standard with which the system currently works, e.g. Rec. 2020; 302: divider, yielding Lmax(x,y) as L/max (R,G,B); 307 luminance mapper actually working as a mapper on maxRGB, yielding m*=TM(maxRGB), with TM some function which defines the luminance transformation part of F_ct; 308: a multiplier, yielding L*=(m*)×Lmax(x,y) and 310 a gain determination unit, being in this embodiment actually a divider, calculating g=L*/L, i.e. the output HDR relative luminance divided by the input SDR relative luminance L; and 311 is a multiplier arranged to multiply the three color components R, G, B with the same g factor.

This circuit may be appropriate for some color encodings. However, one would ideally like to work in typical SDR encodings as they are typically used. Im_LDR as it would come out of HEVC decoder 207 in any typical receiving-side apparatus, would typically be in a non-linear Y'CbCr encoding (wherein we can assume the non-linearity to be a square root approximately). In particular, if one wants the HEVC decoded Y'CbCr images to be directly usable for legacy SDR displays, they would be Rec. 709 interpretable.

One can also design equivalent color mappings, which even if not exactly the same mathematically, i.e. not mapping the various SDR colors to exactly the same HDR colors under the various alternative HDR video decoder embodiments, at least provide a reasonably similarly looking image, e.g. with at least the same colors for the darkest parts of the image. An example where one could deviate is when clipping or soft-clipping some bright values (the second being possible if the image is not needed for further change of those clipped values, e.g. in case the processing circuit is used to derive a SDR secondary grading when receiving a communicated HDR image) instead of keeping them sufficiently below the upper color gamut boundary of the RGB-encoding, but that would typically be a choice of the creation side, e.g. the color grader being responsible for the final look.

An example of what is possible compared to the max(R, G,B)-circuit of FIG. 3 is elucidated with FIG. 4.

The nice property of using a max(R,G,B)-based luminance mapping (or the MAXRGB being the index which looks up in the luminance mapping function shape which corresponding output luminance Luminance_Im_LDR should be used), is that the color transformation will never run out of gamut. E.g., if we have a blue pixel which is near its maximum brightness (near the top of the gamut of possible RGB colors), then the MAXRGB measurement of this pixel's brightness will be close to 1.0, as shown in FIG. 4A. Suppose we have a typical HDR-to-SDR re-grading luminance mapping function of the convex shape as shown. The multiplication factor to use will then be (if the image creation side specified the curve so that an output luminance Lum_LX corresponds to the MAXRGB input value): g=Lum_LX/MAXRGB, which will be slightly above 1.0. B will be the biggest color component, so the other two will be smaller, and no out-of-range mapping can occur for them. B will be mapped to B*g=MAXRGB*Lum_LX/MAXRGB, i.e. this happens to be the same value numerically on a relative 0.0-1.0 scale as the desired luminance Lum_LX, and, within the range of possible B values, i.e. <=1.0.

If one now however one uses another luminance-characterizing value, namely the luminance itself, one can get for this highly saturated color the following. Since L is much smaller (e.g. 0.5), L being the luminance of e.g. that blue color as can be seen in the 2D gamut section shown in FIG. 4B, one will have a relatively larger value for the function output, namely Lum_LL. G=Lum_LL/L will then be approximately 2.0. If one uses the same multiplicative factor scaling of the RGB components with a strategy which is so luminance-specified, one will get for B approximately 1.0 multiplied by g=2.0 an out of range value which is clipped to 1.0. This will typically reduce the saturation of those colors. That may of course be a desired behavior for those colors determined by the creation side (e.g. a human grader), but in this case it is no longer so that all colors are within gamut. However, the grader can specify a curve to be equivalently used for such a luminance-defined color transformation, or in particular luminance transformation. The behavior may yet be different again if one doesn't use the exact luminance L of the pixel color, but the luma Y', because this luma doesn't exactly contain the correct luminance information (some luminance information for saturated colors has leaked into the chrominance components).

However, in that philosophy the creation side, and in particular a human color grader may not have sufficient control of the behavior of what he desires, i.e. how the colors should behave in the SDR look corresponding to the master MAST_HDR image (which he may have artistically created previously, or this image may be straight from camera in other embodiments or applications, etc.).

The inventor aimed at producing a good pragmatic encoding or decoding core circuit incorporable in such a practical Y' CbCr signal path, and also versatile enough given the creator's needs.

SUMMARY OF THE INVENTION

The object of having a more pragmatic, and more versatile and better usable for various particular HDR scene image requirements method of dynamic range conversion is handled by a high dynamic range video decoder (500) arranged to receive an encoding (Im_COD) of a high dynamic range video and to decode and output a set of temporally successive typically high dynamic range images (Im_RHDR), in case e.g. SDR images were received, but in other embodiments mutatis mutandis output dynamic range images of an output dynamic range which is lower than the dynamic range of the received encoded images (Im_COD) comprising:
 an input (502) to receive three weight values (kRY, kGY, kBY);
 a video decoder (501) arranged to decode the encoding (Im_COD) into an intermediate image (Im_RLDR) being in a Y'CbCr color representation;

a brightness index calculation unit (503) arranged to calculate for each pixel of the intermediate image (Im_RLDR) a brightness index (J') being defined as J'=Y'+MAX{kRY*(R'−Y'), kGY*(G'−Y'), kBY*(B'−Y')} where kRY, kGY, kBY represents the three weight values, Y' is the luma value of the Y'CbCr color representation, and R', G', and B' are non-linear color component values derivable from the Y', Cb and Cr values of the Y'CbCr color representation;

a brightness mapper (505) arranged to receive a specification of at least one one-dimensional function F_ct, and to apply it with the brightness index (J') as input, to obtain an output brightness index (J*);

a color processing unit arranged to determine an output color (Y'H, Cb'H, Cr'H) for that each pixel in the output dynamic range image (Im_RHDR) of the set of temporally successive images being currently decoded, which is arranged to determine the output luma Y' to correspond to an output luminance being the input luminance of the color of the each pixel multiplied by a factor which is determined as a function of the ratio of the output brightness index (J*) divided by the brightness index (J').

The color processing unit may comprise:

a multiplication factor calculation unit (506) arranged to calculate a multiplicative factor (g) being equal to the output brightness index (J*) divided by the brightness index (J');

three multipliers (509, 510, 511) to multiply the respective color components (Y, Cr, Cb) of each pixel of the intermediate image (Im_RLDR) with the multiplicative factor (g), to obtain an output color (Y'H, Cb'H, Cr'H) for that pixel in the output dynamic range image (Im_RHDR) of the set of temporally successive high dynamic range images being currently decoded.

Some HDR decoding methods, like the hybrid log-gamma method of the BBC (https://en.wikipedia.org/wiki/Hybrid_Log-Gamma), are rather static, and even if tailored for communicating merely a single HDR look image, i.e. rather ill-suited to the particulars of good HDR scene encoding, which entails also being able to obtain at any receiver side other dynamic range look images (e.g. a 100 nit codec peak brightness (PB_C) SDR variant of a 5000 or 1000 nit master HDR graded image MAST_HDR). And, the other dynamic look images need to be of good quality, e.g. someone standing in the shadow should not have too colorful a shirt when rendered on any display, because that is not how such an ill-illuminated shirt would normally look. So one needs a decoder which is controllable, not merely by a creation-side determined shape of a luminance transformation function (F_ct), but also by weights which determine how to use this function, for each particular color.

This is because a luminance is only one dimension of a pixel color, the other two chromatic components being e.g. (u,v) chromaticities, or (Cb,Cr) chrominances (also called chromas).

If we look at FIG. 4, and we follow the equi-luminance line from the achromatic greys axis in the middle of the color gamut all the way up to the saturated blues, we find that although a color may have the same luminance attribute, that means something totally different for a makeable blue-component brightness in a 3-component additive color definition. For such a blue close to the upper gamut boundary already, perhaps one doesn't desire to use the luminance mapping shape (but one doesn't have further information, because for the pragmatic coding technologies it was decided to use and communicate only one 1D luminance mapping function characterizing the changed dynamic range pixel or object color re-brightening behavior). In WO2014056679 used an elegant solution which always stretched this function to whatever local range was available for any color, e.g. the saturated blue. But this doesn't mean that this would always be the ultimate desired behavior. In this present application, the inventor wanted a more versatile manner, which can define other brightness indexes than just always max(R,G,B), or luminance L alternatively. This is done by defining the new brightness index J', which is dependent on the luma Y' on the one hand (which is directly incoming when the coded Im_COD has been e.g. MPEG-HEVC decoded), and "non-linear color component minus luma"-values on the other hand, e.g. R'−Y'. These are also very useful, because they are up to a constant the inputted Cr and Cb values (also directly present in the decoded intermediate Im_RLDR image), and G'−Y' is calculatable from R'−Y', B'−Y', (and Y', though not usually necessary), because for any given selection of RGB primaries and a white point (e.g. according to Rec. 2020, or Rec. 709, or DCI-P3 etc.), Y' will be uniquely defined as a*R'+b*G'+c*B', with a, b and c real-valued constants. Ergo: G'−Y'=1/b*((1−b+a+c)Y'−a(R'−Y')−c(B'−Y')).

E.g., for Rec. 709 one would have:

$$Y'=0.212600*R'+0.715200*G'+0.072200*B'$$

$$Cb=-0.114572*R'+-0.385428*G'+0.500000*B'$$

$$Cr=0.500000*R'+-0.454153*G'+-0.045847*B'$$

Ergo:

$$R'-Y'=0.000000*Cb+1.574800*Cr$$

$$G'-Y'=-0.187324*Cb+-0.468124*Cr$$

$$B'-Y'=1.855600*Cb+0.000000*Cr$$

And for Rec. 2020:

$$Y'=0.262700*R'+0.678000*G'+0.059300*B'$$

$$Cb=-0.139630*R'+-0.360370*G'+0.500000*B'$$

$$Cr=0.500000*R'+-0.459786*G'+-0.040214*B'$$

Ergo:

$$R'-Y'=0.000000*Cb+1.474600*Cr$$

$$G'-Y'=-0.164553*Cb+-0.571353*Cr$$

$$B'-Y'=1.881400*Cb+0.000000*Cr$$

In the brightness index J'=Y'+MAX{kRY*(R'−Y'), kGY*(G'−Y'), kBY*(B'−Y')}, the values Y', R', G', and B' are non-linear values (as indicated by the '). Specifically, Y' is the luma value of the Y'CbCr color representation and is specifically a non-linear representation (luma) of the corresponding linear luminance value. Specifically, the value Y' of the Y'CbCr color representation may be a linear weighted summation of the R', G', and B' values of the brightness index. Similarly, the values CbCr of the Y'CbCr color representation may be linear weighted summations of the R', G', and B' values of the brightness index. Similarly, the values R'−Y', G'−Y', and B'−Y' of the brightness index may be weighted summations of the values CbCr of the Y'CbCr color representation, and consequently the values R', G', and B' of the brightness index may be weighted summations of the values Y', Cb, and Cr of the Y'CbCr color representation.

The weights in the weighted summations referenced above may be different in different embodiments.

The three weight values kRY, kGY, kBY may be variable values, and thus may be used to adapt the brightness index. The weight values kRY, kGY, kBY may for example be received together with the one-dimensional function F_ct, and indeed may be received together with the encoding of the high dynamic range video.

In some embodiments, a video signal may be received comprising the encoding of the high dynamic range video, the one-dimensional function F_ct, and the weight values kRY, kGY, kBY.

The weight values kRY, kGY, kBY may be received from a (typically remote) encoder (which typically may also provide the high dynamic range video and/or the one-dimensional function F_ct).

Typically the creation side can determine the content-optimized k-values, and let's assume that without limitation this happens by a human color grader (it can also be an automatic content analysis algorithm). E.g., the current HDR scene image may contain such content that the grader desires it is best processed by some luminance re-brightening which is constant luminance luma-dependent (i.e. the index J' into the luminance transformation function should be so that it is a luma, but not a classical luma which is strongly non-constant luminance (i.e. not for all colors an accurate measure of the color's luminance, but rather a fraction thereof depending on the particular chromaticity of the color), but rather an adjusted version J' which is more closely correlating with the actual luminance of a color. Such a strategy may be selected by the grader in case he is e.g. making a final SDR grading, which need not form data for calculating further different dynamic range images, and the currently processed shot of images is e.g. a cathedral, where it is desired or at least acceptable that e.g. the colors of a stained glass window clip or soft-clip.

To get such a more constant luminance version of the luma as inputted (Y'), one can choose (to communicate) a fixed set of k-weights which depend on the selected primaries of the color system in which the colors are defined. I.e., for a BT.2020 color space (and a gamma value taken from BT.1886, because the luminance correlation of a function not only depends on the chromaticities of the primaries but also strongly on the value of the gamma coefficient of the chosen representation, i.e. the EOTF or code allocation function which links the e.g. 10 bit RGB codes to actual to be rendered luminances, whether absolutely defined with respect to a chosen peak brightness PB_C, or relatively defined with respect to a maximum luminance of 1.0), we get for good optimal values for that scenario, e.g.:

$$kRY=0.4208; kGY=0.5357; kBY=0.2645.$$

But the novelty of the present invention is not so much that one can determine such coefficients, but rather that the creation side of the content can communicate to any receiving side that it has made that choice (for the entire movie, or the present image or N images), rather than another one. The reader should understand that we have a decoder, so without having these precise values communicated, one cannot precisely decode, as one will use the wrong index in the luminance mapping function, consequently calculate the wrong multiplicative factor g, and hence associate a different output color with the input color of the present pixel in the intermediate image version of the image as received (Im_RLDR). I.e. in short, one would get an incorrect HDR image reconstructed from the received SDR version (or something similar in other embodiments, e.g. wherein one needs to calculate an SDR equivalent graded image for a received HDR input image, or a second HDR image for another e.g. higher display peak brightness PB_D, etc.).

One could choose the k-weights to be zero, which would yield Y', but preferably in our embodiments we do not do that but rather keep the values above the constant-luminance values (i.e. kRY=0.4208; kGY=0.5357; kBY=0.2645 for the rec. 2020 coded images). The creation side could however chose e.g. kRY=1; kGY=1; kBY=1, in which case the max(R,G,B) behavior would result for that particular image. That would be useful if e.g. the grader didn't want to clip the stained glass windows, but keep them colorful, be it at the cost of dulling the image overall somewhat. So with this new indexing method, one can select any behavior between max(R,G,B) and a luminance-based mapping (or more exactly, a mapping which does depend on the luma Y' but in a manner which more closely follows the exact luminances of the colors, which one could attempt to calculate exactly, but that will be too computationally complex for many practical IC circuits). One can now do many things at the creation side, depending on all the objects which happen to be in the HDR image. E.g., if one doesn't like the way the blue sky is mapping, one could lower the weight of the blue component, since other colors in the scene would likely have a far lesser blue component than the sky, which as a bright and blue object may typically have B'-codes near the maximum, i.e. 1023. That means that one wouldn't severely change the mapping of the other colors, but one could be tuning (and then communicating the actually selected value) the kBY value to adjust the mapping behavior of the sky exactly as desired. Note that we have an index J' in a luminance transformation function, which also still depends on Y', G', and R', so one shouldn't misunderstand this that this is simply a manner to dim the sky. But in some cases indeed the color of some objects may change. E.g. the clothes of somebody standing in a shadow may be too colorful, compared to what one would expect. This can be largely due to a too high brightness, because colorfulness is dependent both on the saturation component of the color's chromaticity and its luminance or brightness, but in some color processing circuit embodiments there could sometimes also be some saturation or even hue changes, compared to what one would rather see in any secondary calculated image (e.g. the master graded HDR image can be perfectly reconstructed, or at least reasonably approximated, because DCT compression quality may also have an impact, but the SDR colors in the image which e.g. is actually communicated may be somewhat different from the HDR colors, and then not just in the sense that one would expect darker colors in a SDR rendering anyway). The grader or in general the creation side has now the liberty to optimize the k-weights to tune all this behavior, until the best looking images come out (i.e. the best SDR image, together with the best HDR image, which could sometimes be a trade-off, if e.g. one limits oneself regarding the luminance transformation function, but the k-weights can handle some of the trade-off, creating better or worse looking SDR images). Before this actually happens at any receiving side, the grader can test the decoding, view the HDR reconstruction on a HDR reference monitor and the SDR image on a SDR reference monitor, and then encode the data (i.e. the one image of the HDR/SDR pair to actually communicate, the luminance mapping function to allow at the receiver transforming the received one of the pair in the non-received one, and the particular values of the k-weights for the presently encoded at least one image; in case the grader doesn't make a selected optimization for the k-weights, one may either write standard value for them in metadata, e.g. (1,1,1), or rely on the receiver to then use those standard values anyway, even when not received, which saves on the amount of bits to be stored or communicated).

It should be clear to the skilled reader that the various components can have standard typical embodification in the various possible uses. E.g. if the decoder resides in a STB or TV IC, then the input for the k-weights may be a pin which is connected to another IC, which reads that data from e.g. a BD disk, or retrieves them from some metadata communication channel, e.g. a HbbTV carousel, or an internet connection, etc. It should also be clear what a video decoder is if we state that this method can for the communication re-use any existing video decoder. E.g., a useful one is the HEVC standard, but one could use a mechanism based on MPEG 2 as well, or some future still to be defined container for three-component pixel color communication, whether DCT-based or not. Preferably the three components are 10 bit at least, but that is also not a hard limitation for the present invention, i.e. 12 bits or more may also be used, or even 8 bit for significantly resource-constrained systems or applications.

We point the reader to that he should note and understand that—although in actuality the communicated images may be of various dynamic range, and that the decoder may decode to output images of a dynamic range which can be higher or lower than the dynamic range of the received images (the reader can understand the system by first simply assuming that an SDR image is communicated, which is luminance transformed into a reconstruction of e.g. the master HDR image which was created at the content side, and then consider and find equivalently calculatable with our invention the other variants, e.g. calculating a 1500 nit output image from a received 1000 nit Im_COD coded image, etc.), what is actually always communicated in that manner are high dynamic range images of a particular scene, whatever content it contains (or more precisely, two differently graded looks of that scene are communicated, i.e. a pair of images of a lower and higher dynamic range, and, even all information allowing a receiver to calculate a re-graded image of yet another different, third dynamic range).

It is not necessarily so that the weights should be the same for an entire image, so for some more advanced systems it may be advantageous if the high dynamic range video decoder (500) is further arranged to receive a second set of three weight values (kRY2, kGY2, kBY2), and comprising a pixel condition tester (601) arranged to test at least one of a spatial position (x,y) in the image of the pixel being processed, or whether a color of the pixel is within a specific range of a specified color (u1,v1). It can in principle do tests to arrive at different k-weight values for each pixel separately. Of course the k-weights will still need to be communicated, so there will typically be a first trio, and a second trio, and may be even further trios, and there may be a pixel test, which classifies the pixel either in first_situation, in which case the first trio of weights should be used to calculate the appropriate brightness index J', and if the test indicates the second situation, then the second received k-weights are used. It can be either so that in a closed system the creation side knows which test algorithm the receiver will always use, so it can determine reliably what the receiver will do, when having the grader optimize the k-weights (either in one step, or iteratively until they're good). More advanced embodiments could even communicate a test criterion, e.g. at the beginning of a movie. The skilled reader can understand how one can determine test criteria, e.g. on the basis of even one communicated color (u1,v1). To elucidate this, we give two examples in FIG. 7. E.g. in FIG. 7B, the test can be whether a color resides in a sector which is bounded by a delta_hue angle around (u1,v1), whether fixed in the receiver, or communicated, as further metadata. And the test assumption may e.g. be that only the most saturated colors should test positively for the second set of k-weights to be used, e.g. if the saturation of the pixel being processed is above 75% of the saturation of the (u1,v1) color. The skilled reader can imagine other ways to delineate or communicate a color region e.g. via two delta_hues, and saturations boundaries, or minimum and maximum color boundaries, etc. In FIG. 7A we exemplify a geometrical test, namely if the pixel location is (x,y) the test performed by pixel condition tester (601) would be positive, but of course more complex test specifications are possible allowing the identification of several pixel positions, and the various test conditions can be combined.

To allow the above HDR decoder, one needs a corresponding high dynamic range video encoder at the content creation, or (trans)coding side in general, which may have various automatic, semi-automatic, or manual embodiments, but which according to the present invention principles would typically comprise:

an input (502) to receive three weight values (kRY, kGY, kBY);

a video decoder (501) arranged to decode the encoding (Im_COD) into an intermediate image (Im_RLDR) being in a Y'CbCr color representation;

a brightness index calculation unit (503) arranged to calculate for each pixel of the intermediate image (Im_RLDR) a brightness index (J') being defined as J'=Y'+MAX{kRY*(R'−Y'), kGY*(G'−Y'), kBY*(B'−Y')} where kRY, kGY, kBY represents the three weight values, Y' is the luma value of the Y'CbCr color representation, and R', G', and B' are non-linear color component values derivable from the Y', Cb and Cr values of the Y'CbCr color representation;

a brightness mapper (505) arranged to receive a specification of at least one one-dimensional function F_ct, and to apply it with the brightness index (J') as input, to obtain an output brightness index (J*);

a multiplication factor calculation unit (506) arranged to calculate a multiplicative factor (g) being equal to the output brightness index (J*) divided by the brightness index (J');

three multipliers (509, 510, 511) to multiply the respective color components (Y, Cr, Cb) of each pixel of the intermediate image (Im_RLDR) with the multiplicative factor (g), to obtain an output color (Y'H, Cb'H, Cr'H) of an output image (Im_REC) of a different dynamic range than the intermediate image;

an output for the encoding (Im_COD), the function (F_ct) and the three weight values (kRY, kGY, kBY); and a means (820, 821) to evaluate the color quality of at least one of the intermediate image and the output image.

For the manual encoding systems, the means may be at least one display (821), which will typically be a reference monitor, and which allows the content creator to check what quality the current setting will yield at a receiving side, if the HDR image has its particulars, and all to be communicated parameters are as they currently are.

If the quality is below a determined minimum, a proposition of a new values for the three k-weight values (kRY, kGY, kBY) may be done by the creator, e.g. he may know that in the particular situation lowering the kBY value by 50% may give better visual quality results, in particular the appropriateness of the colors, which change of kBY he may do on a user interface (804), e.g. a turn-dial on a grading console, which is linked to the hardware of the encoder, or a software version thereof running on a computer. Fully automatic systems may work on the basis of precoded behavior rules. E.g., the system may propose a set of k-weights which is presumably optimal or sufficiently good given the particulars of the image(s), e.g. the histogram of the luminances, but also e.g. a noise characterizing measure, etc. The means (820) in that case will be a calculation unit measuring characteristic parameters indicating whether at least one of the two image of the pair of different dynamic range images (i.e. typically a HDR, e.g. 1000 nit PB_C image, and a SDR image) is of sufficient quality. That some automatic systems or graders check only one image, is because some applications may care only about the quality of one of the gradings, e.g. the HDR quality only. But the reader should understand that in that system there will still be two different dynamic range images, or two different gradings (whether human-determined or automatically determined), because the coding system may still communicate that HDR image to be consumed actually as the corresponding SDR image. So basically there are two variants. Whereas we elucidated the principles in FIG. 8 merely with an SDR image (Im_LDR) being encoded, and then the encoder mirroring the decoder hardware to allow checking with what reconstruction quality a HDR reconstructed Im_REC would be obtainable, the same circuit can mutatis mutandis be used to get as Im_COD an HDR image, and calculate with a circuit the corresponding SDR image therefore as output image. The automatic means (820, 821) to evaluate the color quality can e.g. calculate a color difference measure, e.g. Q=a*delta_colorfulness, where delta_colorfulness is the average difference in colorfulness over a set of selected colors in the HDR versus the SDR grading (or in general the first and second dynamic range image). But in other embodiments one could also measure colorfulness or other color differences between original and reconstructed (i.e. receiver-side) images of the same dynamic range, e.g. the MAST_HDR versus the reconstructed HDR image. And the automatic quality evaluation means could calculate a final quality based on several such measures. If the quality is too low, it can propose different kRY, kGY, and kBY values. Some embodiments could do so blindly iteratively, until a good quality is reached, or a number of iterations exceeds a maximal number. Better automatic systems know from artificial intelligent rules in which direction and approximately how they should change the k-weights, for a particular evaluated situation.

Finally, in case all parameters, and in particular the k-weights are appropriate, this data is output, e.g. in a specific metadata format. e.g. a dedicated SEI message or equivalent message in another communication technology to reach either a temporary storage memory, or portable memory product, or network link, etc. Note that in principle one could also use more than three k-weights, e.g. when there is a yellow channel, etc., but likely most embodiments will match with the three typical color channels.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings:

FIG. 4 schematically shows how a function shape can determine a brightness change for image pixels, but also how various input values corresponding to the pixel color can lead to various different brightness changes, i.e. a different artistic look for the output image corresponding to such a color in particular luminance transformation applied to an input image;

FIG. 7 elucidates two possible examples of tests that could be performed by the condition tester.

DETAILED DESCRIPTION OF THE EMBODIMENTS

FIGS. 1-4 have already been explained above. We would like to note however that they are mere (elucidation) embodiments of the principles, e.g. instead of actually dividing to obtain the g, this could in practical variants be embodied as a single LUT, already divided, etc.

Figure 1:
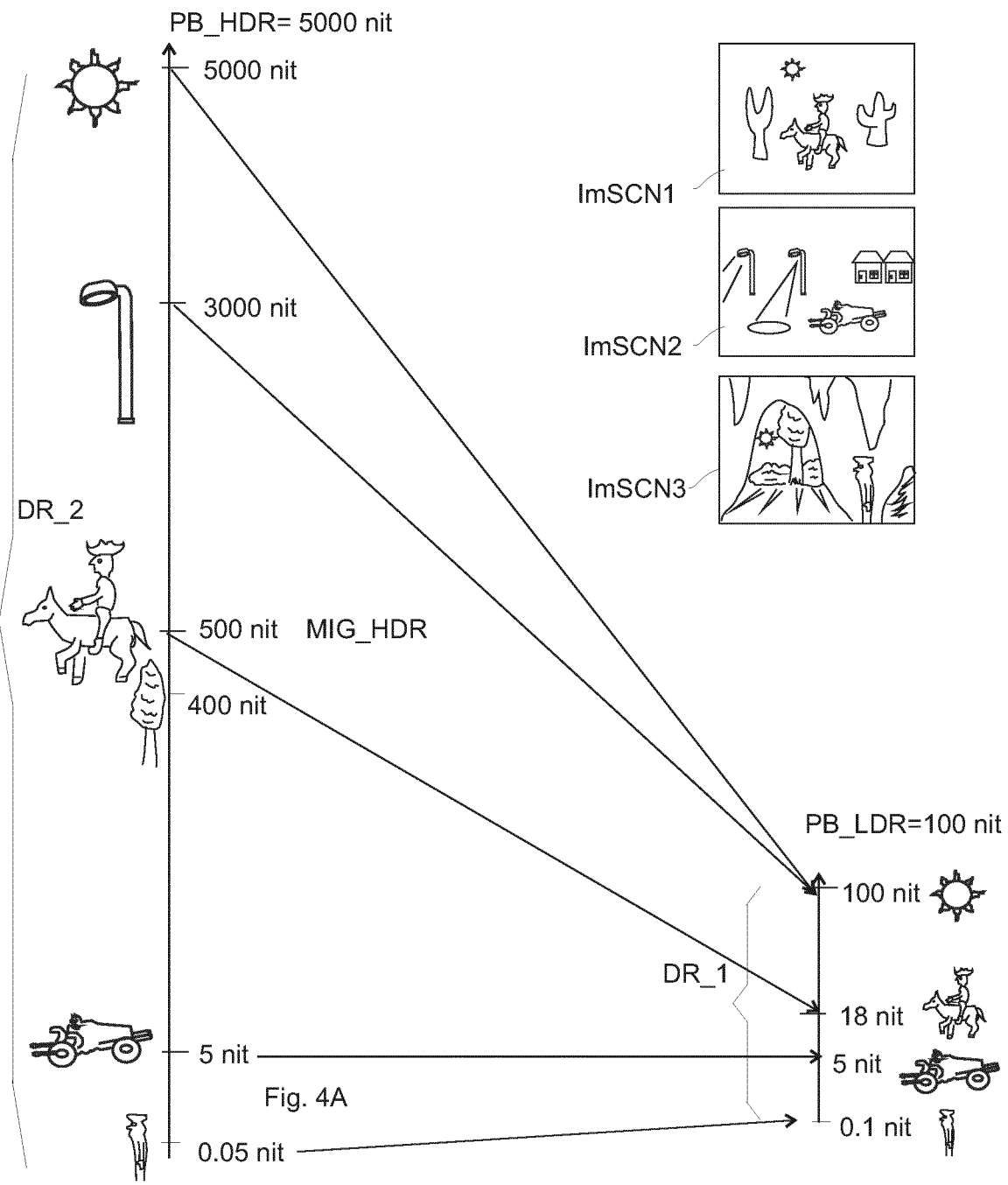
FIG. 1 schematically illustrates a number of typical color transformations which occur when one optimally maps a high dynamic range image to a corresponding optimally color graded similarly looking (as similar as desired and feasible given the differences in the first and second dynamic ranges DR_1 resp. DR_2), which in case of reversibility would also correspond to a mapping of an LDR image of the HDR scene, to a HDR image of that scene.
Figure 2:
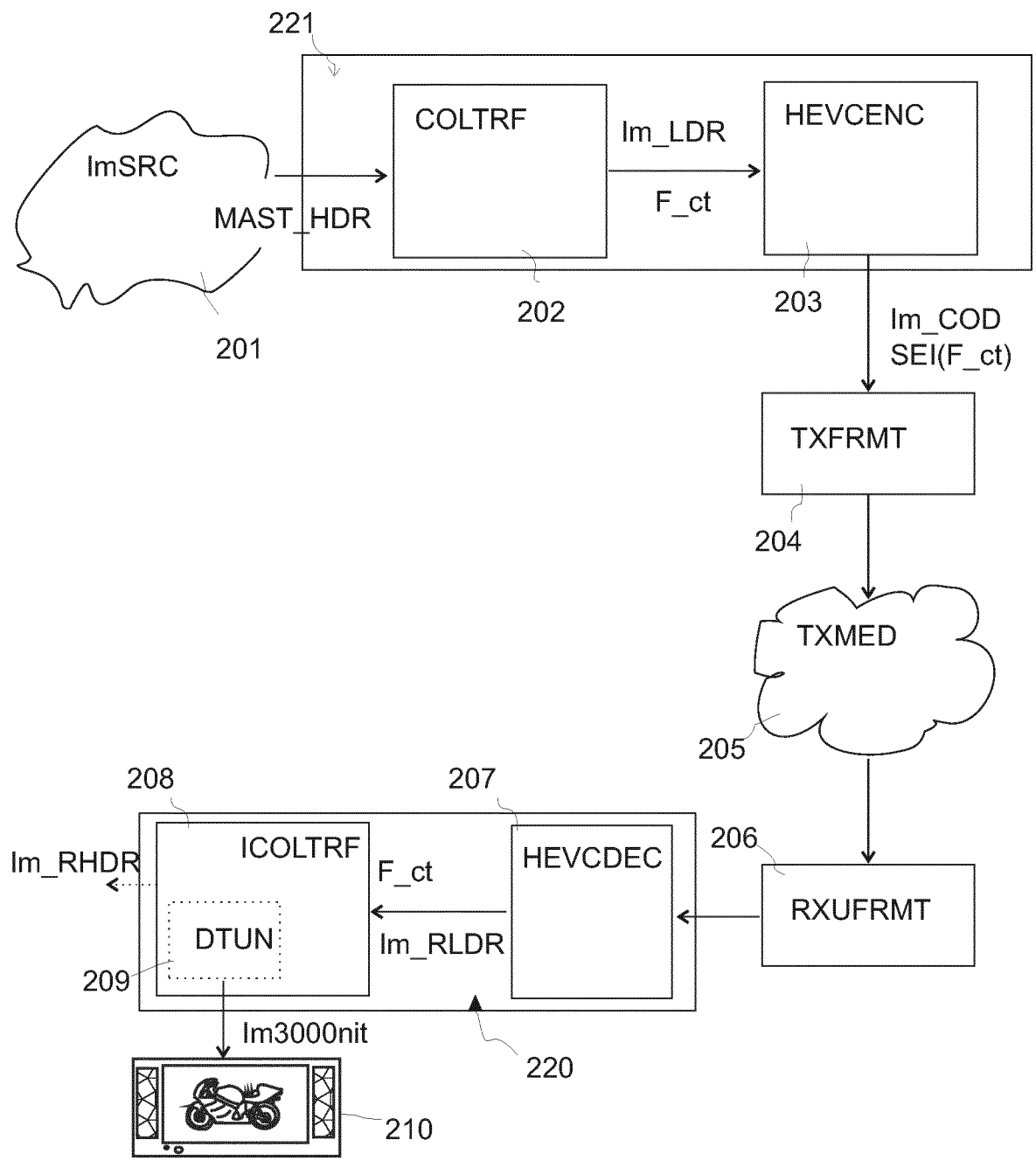
FIG. 2 schematically illustrates a technology to encode high dynamic range images, i.e. images capable of having luminances of at least 400 nit typically or more, which applicant recently developed, which actually communicates the HDR image(s) as an LDR image plus metadata encoding color transformation functions comprising at least an appropriate determined luminance transformation for the pixel colors, to be used by the decoder to convert the received LDR image(s) into HDR images(s) which are a faithful reconstruction of the original master HDR image(s) created at the image creation side.
Figure 3:
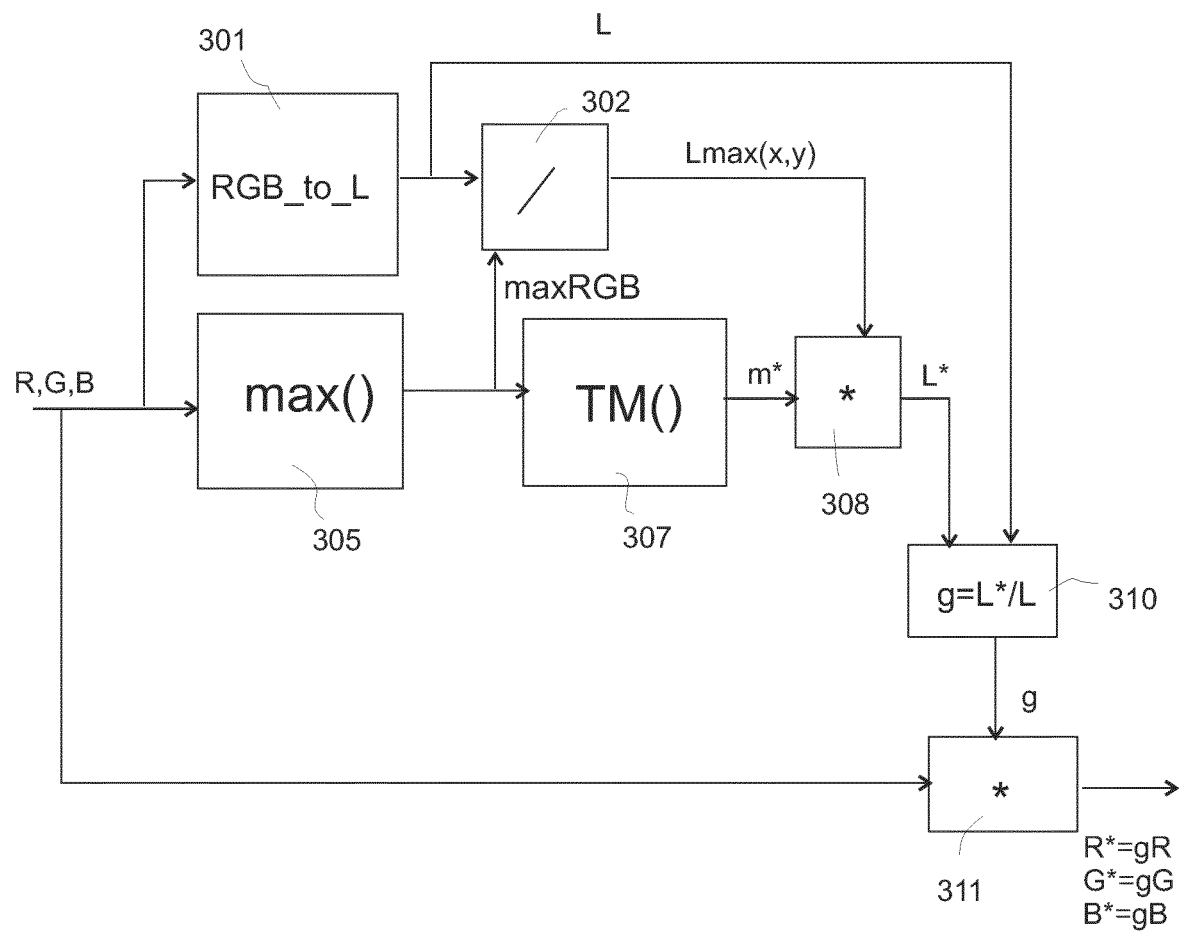
FIG. 3 schematically illustrates a first version technology of applicant which can be used to enable a within-gamut color (i.e. chromaticity)-preserving luminance transformation for changing the brightnesses of image objects or pixels for making them more conforming to what is needed in an image of a dynamic range which is different and specifically larger than the dynamic range of the input image, which works well for particular types of situations.
Figure 5:
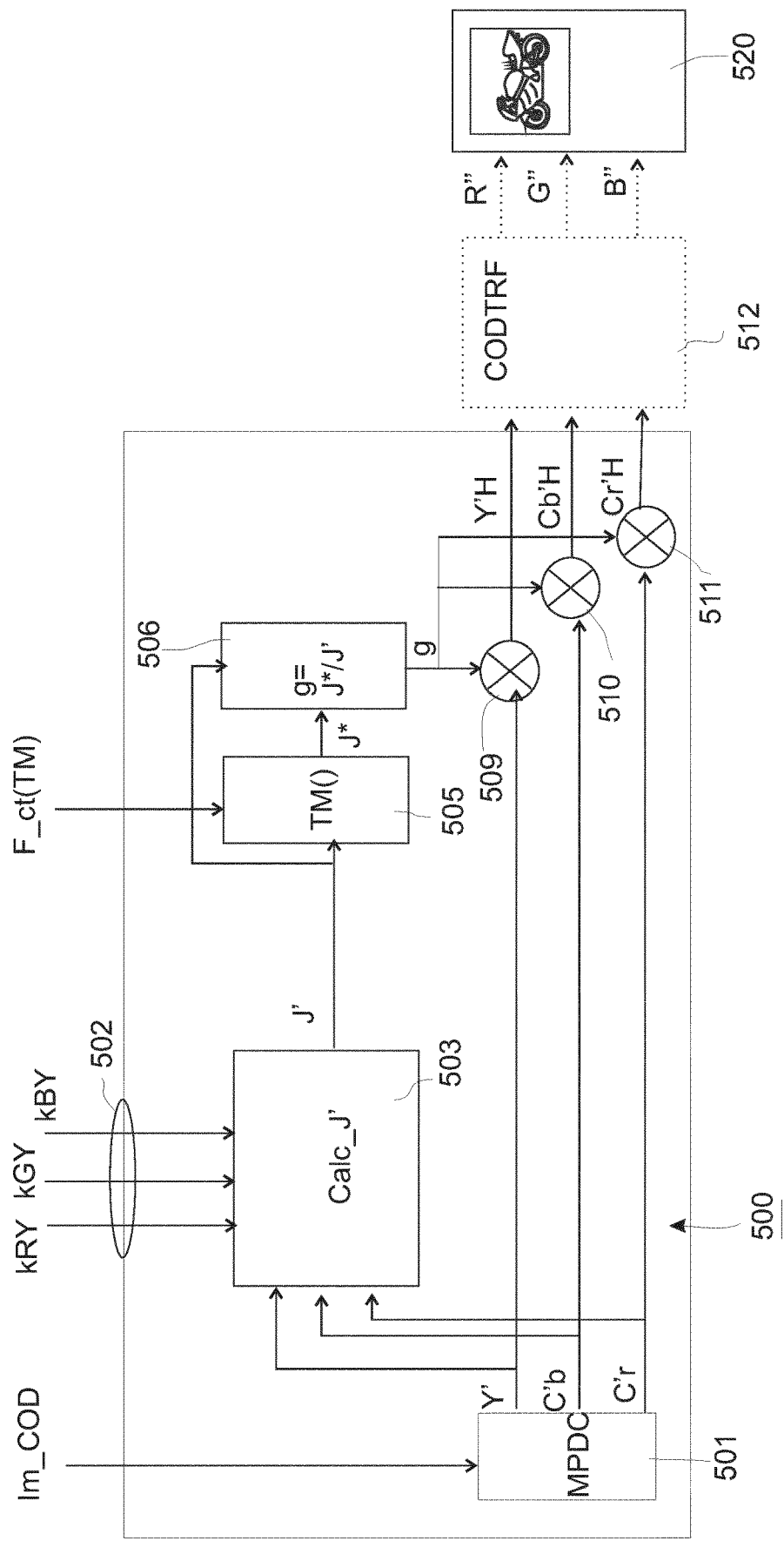
FIG. 5 schematically shows the newly invented color transformation part of a HDR video decoder.

FIG. 5 shows a simple embodiment of the new decoder 500. It has an input to receive encoded images, say e.g. an SDR image, normally encoded according to a legacy HEVC compression (i.e. a lossy compression, but there may be other variants, as this is merely one possible embodiment which is elucidated). A video decoder (501) applies HEVC decoding, and yield a normal image, with pixel colors represented in a Y'C'bC'r representation, i.e. a Rec. 709 luma+two chrominances (i.e. whatever the pixel colors, one can interpret this image as normal SDR). Three k-weights are received via input 502, and we will assume they stay constant for the current shot of N images of the same HDR scene, i.e. they have been communicated and extracted prior to the processing of the first image of the shot. A brightness index calculation unit (503) is arranged to calculate for each pixel consecutively in e.g. a zigzag scan of the intermediate image (Im_RLDR) having those Y'C'b C'r colors a brightness index (J') being defined as $J'=Y'+MAX\{kRY^*(R'-Y'), kGY^*(G'-Y'), kBY^*(B'-Y')\}$, with the presently applicable k-weights. It will thereto calculate R'-Y' etc. from Y'C'b and C'r which is standard because the e.g. Rec. 709 standard defines C'b and C'r uniquely based on those non-linear color differences R'-Y' etc. Then the multiplicative factor g is established as in our prior art above explained (any embodiment thereof being useable again), and finally the luminance transformation is realized via the three multipliers (509, 510, 511), yielding the corresponding output colors, also easily in the similarly normalized Y'C'b C'r representation. The codification of the required luminance transformation shape F_ct may also be input in various manners depending on in which actual system the decoder resides, e.g. it may read this from a sector on a blu-ray disk, or receive a metadata signal, etc. But, now we have the correct colors for the output image of different dynamic range, which without losing generality we assume to be a HDR image, e.g. with PB_C=1000 nit. A further color transformation unit 512 may be present to transform colors directly to e.g. some R"G"B" representation for driving some connected display 520.

Figure 6:
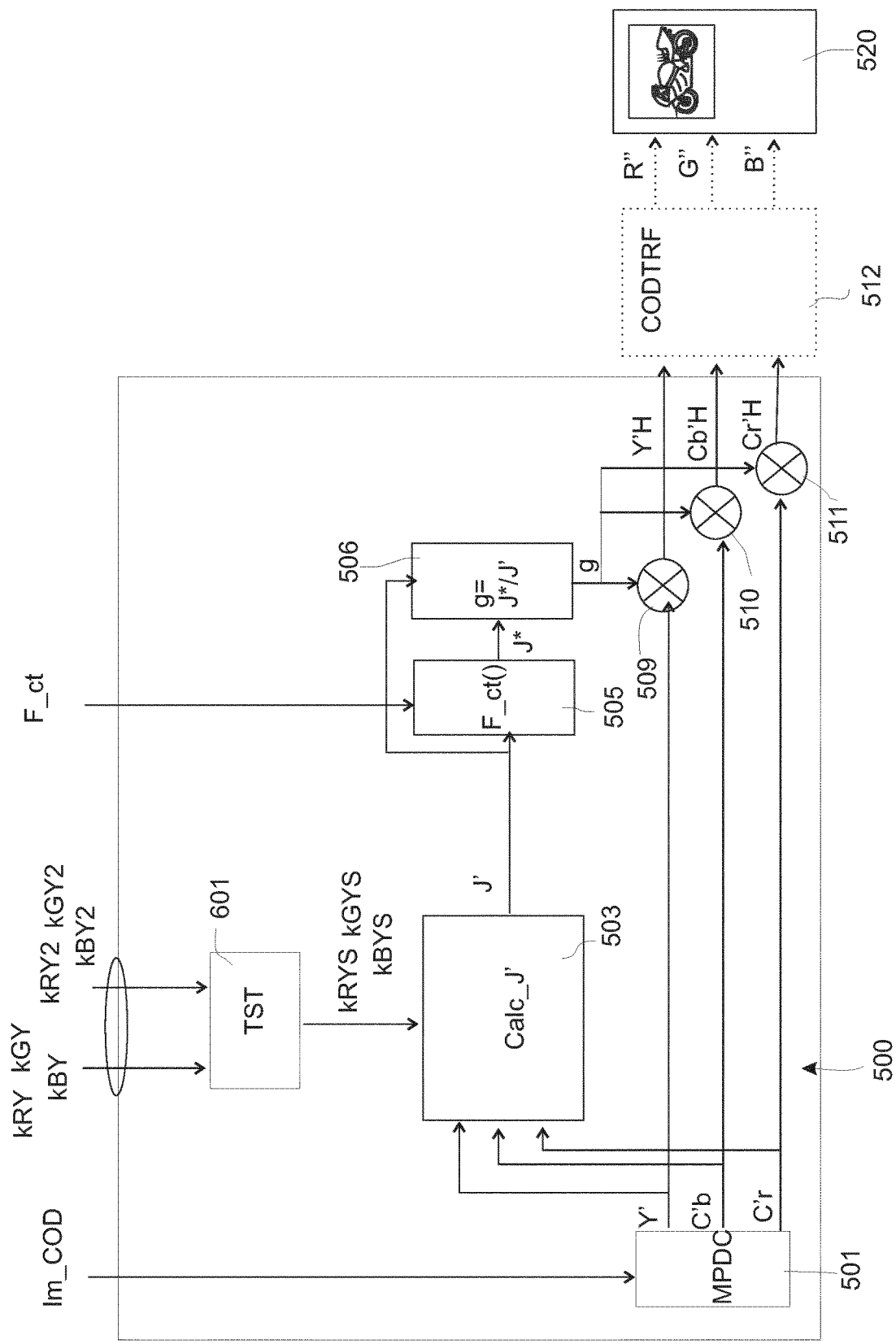
FIG. 6 schematically shows a more complicated embodiment of the new decoder, comprising a condition tester (601) allowing the appropriate selection of one of at least two communicated trios of weights.

FIG. 6 shows the same decoder components, but now for an embodiment which receives two to be used alternative k-weight trios, and a condition tester 601 which tests which of those two should be applied when calculating the brightness index J' for the pixel currently being processed. The skilled reader can understand that decoder manufacturers may built various testers according to this principle, and it is the principle which is important rather than the particulars.

Figure 8:
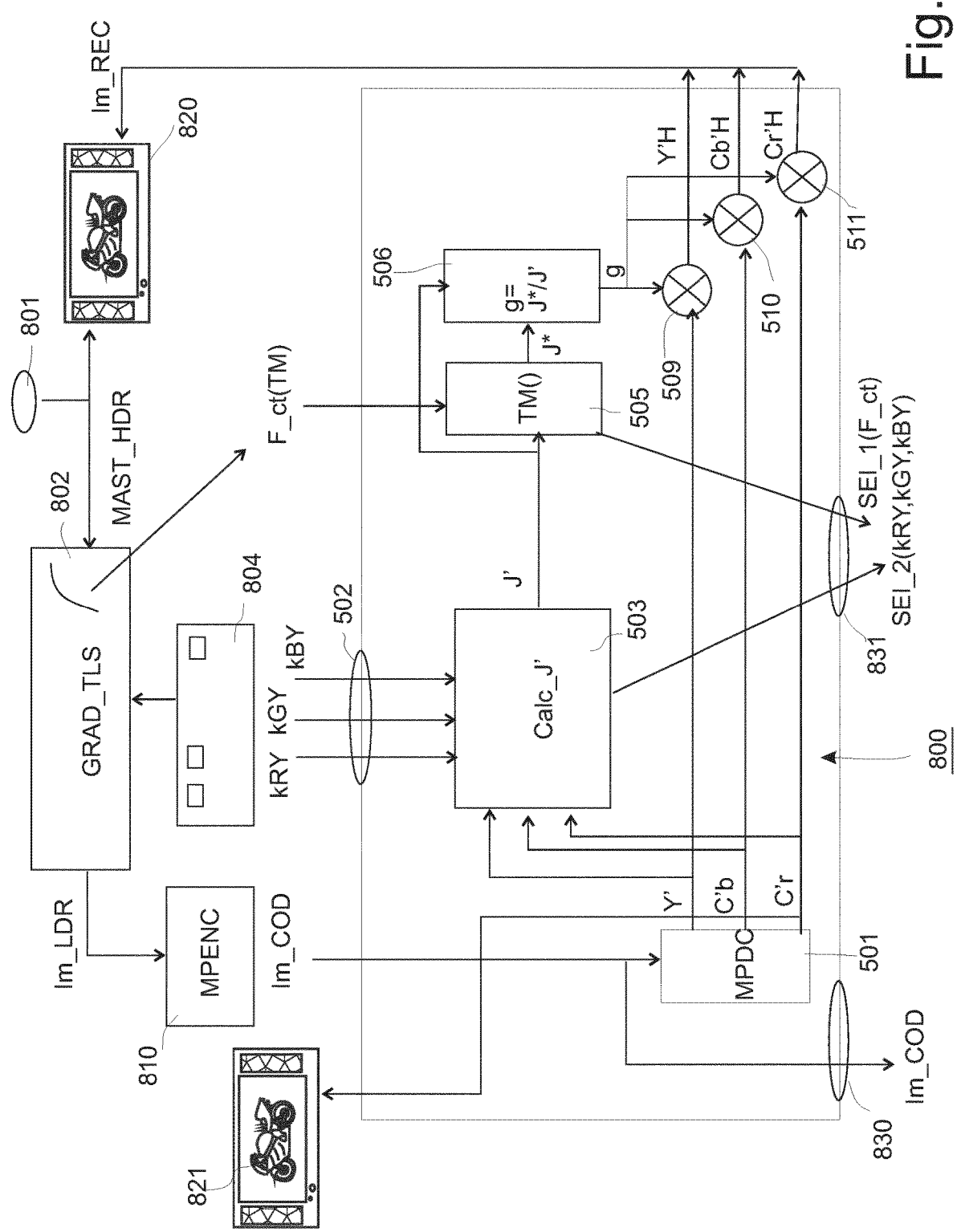
FIG. 8 elucidates with one example how a typical creation side system, and particular its HDR video encoder, could look.

FIG. 8 shows merely one elucidation embodiment for understanding what the creation/encoding side can look like. We assume in this embodiment that a master HDR grading MAST_HDR was already created previously, and is read from memory 801. We assume the grader will at this moment create a SDR equivalent grading for the MAST-HDR (but in other embodiments both may already have been made previously, and the encoder merely encodes both as e.g. 1 consecutive set of SDR images+the metadata (luminance transformation functions, and k-weights where appropriate, for at least one image of the video). The SDR image is graded by using color grading means 802, which may apply various colorimetric transformations, but we assume e.g. a power function is used to map the luminance, e.g. with a gamma of ⅛, just for understanding the principles. This SDR image is then encoded with an encoder 810, e.g. doing HEVC encoding. In this example we assume a typical configuration where the content creation/encoding system comprises a mirror of the decoder, but other variants would be possible. We have given those mirror components the same numbers as in FIG. 5, and we assume they do exactly the same processing. However, now the encoder 800 has outputs for the required data to be communicated to any receiver. We assumed in this embodiment there is a separate first output 830 for the encoded (e.g. SDR) images Im_COD, and second output 831 for the metadata, codifying the luminance mapping function(s) F_ct and the k-weights which are also needed at the receiving side(s). The skilled reader can imagine how such outputs would be implemented in practice for various HDR video communication systems (e.g. OTT internet-based, satellite TV, a professional link between a production side and e.g. an intermediate relay station e.g. of a cable operator, etc.), and we will not further elaborate on them as they are not the core characteristic needed for understanding this invention. What is also different from the decoding side, is that the output image of second dynamic range, i.e. e.g. the reconstruction of the 1000 or 5000 nit MAST_HDR video, Im_REC, is now outputted for evaluation rather than for final consumption as in a decoder. The grader may want to check the images on at least one of a first display 821 and a second display 820, e.g. a SDR monitor, and a 5000 nit reference HDR monitor. In case he is not satisfied with the values of the k-weights, and the ensuing decoding quality and in particular its colorimetric behavior for the various image object colors, whether the k-weights were previously determined by him or automatically determined or preset, he may want to change at least one of them via user interface 804. As said above, the same can be realized in various automatic embodiments, e.g. in a camera or OB van, and then a human may still watch the quality on at least one display, and may be even correct at certain times by changing a k-weight from its automatic value, but in other embodiments a human may not be present. Note that the function used in the decoder-mirrored path will typically be copied as the inverse of the one used in the HDR-to_LDR grading, i.e. in color grading means 802.

Where the present invention is very advantageous when working in the three color component multiplicative rebrightening embodiment, it can also be used in other luminance changing embodiments of higher dynamic range video encoders or decoders. E.g., when we have the appropriately indexed output luminance (as needed) corresponding to the input luminance, one could use the method (/apparatus) to process e.g. only a luma or luminance channel, doing then other processing with the chrominances. This may lead to somewhat different colorimetric behavior, e.g. hue or saturation shifts, but the choice of a least one k-weight can be used mutatis mutandis in these systems, to obtain the most appropriate HDR and SDR, or first and second dynamic range look image. The multiplication by a factor (g1) which is determined by the ratio of the output brightness index (J*) divided by the brightness index (J'), i.e. the relation between luminances versus lumas, is determined by the function relating those two equivalent characterizations of the pixel color brightness. I.e. g1 is a function of g. E.g., if we consider the lumas Y' to be defined as a square root of the luminances, when saying that L_out=g1*L_in, we can also say that Y'_out=sqrt(L_out)= sqrt(g1*L_in)=g*Y_in, or g=sqrt(g1). I.e., if the sqrt function is the OETF or code allocation function defining the luma codes corresponding with to be rendered luminances, the functional relationship of the new multiplicative constant (for single power functions) means: g=OETF(g1).

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A high dynamic range video decoder arranged to receive an encoded image of a high dynamic range video and to decode and output a set of temporally successive images comprising:
   an input circuit, wherein the input circuit is arranged to receive three weight values (kRY, kGY, kBY);
   a video decoder circuit,
      wherein the video decoder circuit is arranged to decode the encoded image of the high dynamic range video into an intermediate image,
      wherein the intermediate image is in a Y'CbCr color representation;
   a brightness index calculation circuit unit,
      wherein the brightness index calculation circuit is arranged to calculate for each pixel of the intermediate image a brightness index (J'),
      wherein the brightness index (J') is defined as $J'=Y'+MAX\{kRY*(R'-Y'), kGY*(G'-Y'), kBY*(B'-Y')\}$,
      wherein kRY, kGY, kBY represents the three weight values,
      wherein Y' is the luma value of the Y'CbCr color representation,
      wherein R', G', and B' are non-linear color component values derivable from the Y',
      wherein Cb and Cr are values of the Y'CbCr color representation;
   a brightness mapper circuit, wherein the brightness mapper circuit is arranged to receive a specification of at least one one-dimensional function F_ct, and to apply it with the brightness index (J') as input, to obtain an output brightness index (J*);
   a color processing circuit,
      wherein the color processing circuit is arranged to determine an output color (Y'H, Cb'H, Cr'H) for each pixel in the output dynamic range image of the set of temporally successive images being currently decoded,
      wherein the color processing circuit is arranged to determine an output luma Y' such that the output luma Y' corresponds to an output luminance being the input luminance of the color of the each pixel multiplied by a factor which is determined as a function of the ratio of the output brightness index (J*) divided by the brightness index (J').

2. A high dynamic range video decoder as claimed in claim 1, wherein the color processing circuit comprises:
   a multiplication factor calculation circuit, wherein the multiplication factor calculation circuit is arranged to calculate a multiplicative factor (g), wherein the multiplicative factor (g) is equal to the output brightness index (J*) divided by the brightness index (J'); and
   three multipliers, wherein each of the three multipliers are arranged to multiply the respective color components (Y, Cr, Cb) of each pixel of the intermediate image with the multiplicative factor (g) so as to obtain an output color (Y'H, Cb'H, Cr'H) for that pixel in the output dynamic range image of the set of temporally successive images being currently decoded.

3. A high dynamic range video decoder as claimed in claim 1, further comprising a pixel condition tester circuit,
   wherein the pixel condition tester circuit is arranged to test at least one of a spatial position (x,y) in the image of the pixel being processed, or whether a color of the pixel is within a specific range of a specified color (u1,v1),
   wherein the high dynamic range video decoder is arranged to receive a second set of three weight values (kRY2, kGY2, kBY2).

4. A method of high dynamic range video decoding to obtain a set of temporally successive high dynamic range images comprising:
   receiving an encoded image of a high dynamic range video;
   receiving three weight values (kRY, kGY, kBY);
   decoding the encoded image of the high dynamic range video into an intermediate image in a Y'CbCr color representation;
   calculating for each pixel of the intermediate image a brightness index (J'),
      wherein the brightness index (J') is defined as $J'=Y'+MAX\{kRY*(R'-Y'), kGY*(G'-Y'), kBY*(B'-Y')\}$,
      wherein kRY, kGY, kBY represents the three weight values,
      wherein Y' is the luma value of the Y'CbCr color representation,
      wherein R', G', and B' are non-linear color component values derivable from the Y', wherein Cb and Cr are values of the Y'CbCr color representation;

receiving a specification of at least one one-dimensional function F_ct;

applying the at least one one-dimensional function F_ct with the brightness index (J') as input, to obtain an output brightness index (J*);

calculating a multiplicative factor (g), wherein the multiplicative factor (g) is equal to the output brightness index (J*) divided by the brightness index (J'); and multiplying the respective color components (Y, Cr, Cb) of each pixel of the intermediate image with the multiplicative factor (g), to obtain an output color (Y'H, Cb'H, Cr'H) for that pixel in the output dynamic range image of the set of temporally successive high dynamic range images being currently decoded.

5. A high dynamic range video encoder arranged to determine an encoded image of a high dynamic range video comprising:

an input circuit, wherein the input circuit is arranged to receive three weight values (kRY, kGY, kBY);

a video decoder circuit,
wherein the video decoder circuit is arranged to decode the encoded image of the high dynamic range video into an intermediate image,
wherein the intermediate image is in a Y'CbCr color representation;

a brightness index calculation circuit,
wherein the brightness index calculation circuit is arranged to calculate for each pixel of the intermediate image a brightness index (J'),
wherein the brightness index (J') is defined as J'=Y'+ MAX{kRY*(R'-Y'), kGY*(G'-Y'), kBY*(B'-Y')},
wherein kRY, kGY, kBY represents the three weight values,
wherein Y' is the luma value of the Y'CbCr color representation,
wherein R', G', and B' are non-linear color component values derivable from the Y',
wherein Cb and Cr values of the Y'CbCr color representation;

a brightness mapper circuit, wherein the brightness mapper circuit is arranged to receive a specification of at least one one-dimensional function F_ct, and to apply it with the brightness index (J') as input, to obtain an output brightness index (J*);

a multiplication factor calculation circuit, wherein the multiplication factor calculation circuit is arranged to calculate a multiplicative factor (g), wherein the multiplicative factor (g) is equal to the output brightness index (J*) divided by the brightness index (J');

three multipliers, wherein each of the three multipliers are arranged to multiply the respective color components (Y, Cr, Cb) of each pixel of the intermediate image with the multiplicative factor (g) so as to obtain an output color (Y'H, Cb'H, Cr'H) of an output image of a different dynamic range than the intermediate image;

an output for the encoded image of the high dynamic range video, the function F_ct and the three weight values (kRY, kGY, kBY); and an evaluation circuit, wherein the evaluation circuit is arranged to evaluate the color quality of at least one of the intermediate image and the output image.

6. A method of high dynamic range video encoding to determine an encoded image of a high dynamic range video comprising:

receiving three weight values (kRY, kGY, kBY);

decoding the encoded image of the high dynamic range video into an intermediate image, wherein the intermediate image is in a Y'CbCr color representation;

calculating for each pixel of the intermediate image a brightness index (J'),
wherein the brightness index (J') is defined as J'=Y'+ MAX{kRY*(R'-Y'), kGY*(G'-Y'), kBY*(B'-Y')},
wherein kRY, kGY, kBY represents the three weight values,
wherein Y' is the luma value of the Y'CbCr color representation,
wherein R', G', and B' are non-linear color component values derivable from the Y',
wherein Cb and Cr values of the Y'CbCr color representation;

receiving a specification of at least one one-dimensional function F_ct;

applying F_ct and t apply it with the brightness index (J') as input, to obtain an output brightness index (J*);

calculating a multiplicative factor (g), wherein the multiplicative factor (g) is equal to the output brightness index (J*) divided by the brightness index (J');

multiplying the respective color components (Y, Cr, Cb) of each pixel of the intermediate image with the multiplicative factor (g), to obtain an output color (Y'H, Cb'H, Cr'H) of an output image, wherein the output image has e-f a different dynamic range than the intermediate image;

outputting the encoded image of the high dynamic range video, the function F_ct and the three weight values (kRY, kGY, kBY); and evaluating the color quality of at least one of the intermediate image and the output image.

* * * * *